(12) United States Patent
Chacon

(10) Patent No.: US 9,765,757 B2
(45) Date of Patent: Sep. 19, 2017

(54) SYSTEM AND METHOD FOR PREVENTING ROTOR BLADE TOWER STRIKE

(71) Applicant: General Electric Company, Schenectady, NY (US)

(72) Inventor: Joseph Lawrence Chacon, Greenville, SC (US)

(73) Assignee: General Electric Company, Schenectady, NY (US)

( * ) Notice: Subject to any disclaimer, the term of this patent is extended or adjusted under 35 U.S.C. 154(b) by 923 days.

(21) Appl. No.: 14/087,024

(22) Filed: Nov. 22, 2013

(65) Prior Publication Data

US 2015/0147172 A1   May 28, 2015

(51) Int. Cl.
*F03D 7/02* (2006.01)

(52) U.S. Cl.
CPC ......... *F03D 7/0224* (2013.01); *F03D 7/0244* (2013.01); *F03D 7/0264* (2013.01); *Y02E 10/723* (2013.01)

(58) Field of Classification Search
CPC .... F03D 7/0224; F03D 7/0244; F03D 7/0264; F03D 7/0248
USPC ...................................................... 416/155
See application file for complete search history.

(56) References Cited

U.S. PATENT DOCUMENTS

| | | | |
|---|---|---|---|
| 6,619,918 B1 | 9/2003 | Rebsdorf | |
| 6,940,185 B2 | 9/2005 | Andersen et al. | |
| 7,059,822 B2 | 6/2006 | LeMieux et al. | |
| 7,086,834 B2 | 8/2006 | LeMieux | |
| 7,175,390 B2 * | 2/2007 | Wobben | F03D 7/0224 200/18 |
| 7,246,991 B2 | 7/2007 | Bosche | |
| 7,755,210 B2 | 7/2010 | Kammer et al. | |
| 8,123,477 B2 | 2/2012 | Risager et al. | |
| 8,131,402 B2 | 3/2012 | Neumann | |
| 8,292,568 B2 | 10/2012 | Watanabe | |
| 8,334,610 B2 | 12/2012 | Migliori | |
| 8,482,147 B2 | 7/2013 | Moser et al. | |
| 2003/0116970 A1 * | 6/2003 | Weitkamp | F03D 7/0224 290/44 |
| 2004/0201220 A1 | 10/2004 | Andersen et al. | |

(Continued)

FOREIGN PATENT DOCUMENTS

| | | | |
|---|---|---|---|
| DE | WO 2012140267 A1 * | 10/2012 | ........... F03D 7/0224 |
| EP | 1 230 479 | 9/2004 | |

*Primary Examiner* — Dwayne J White
*Assistant Examiner* — Aaron R Eastman
(74) *Attorney, Agent, or Firm* — Dority & Manning, P.A.

(57) ABSTRACT

A system and method for preventing a rotor blade from striking a tower of the wind turbine is disclosed. The system includes a pitch adjustment mechanism, at least one electrical switch, and a mechanically-actuated positional switch. The pitch adjustment mechanism is configured to rotate the rotor blade about a pitch axis. Further, the pitch adjustment mechanism includes a motor and a brake. The electrical switch is configured with the motor, the brake, or both. The mechanically-actuated positional switch is fixed within a hub of the wind turbine. Further, the positional switch is configured with the electrical switch such that if the rotor blade rotates to an unsafe region, the positional switch is configured to trigger the electrical switch to implement one of tripping power to the motor of the pitch adjustment mechanism or actuating the brake of the pitch adjustment mechanism.

17 Claims, 7 Drawing Sheets

(56) References Cited

U.S. PATENT DOCUMENTS

| | | |
|---|---|---|
| 2005/0280412 A1 | 12/2005 | Roeseler et al. |
| 2006/0099075 A1* | 5/2006 | Von Mutius .......... F03D 7/0224 416/131 |
| 2008/0101930 A1 | 5/2008 | Bosche |
| 2009/0246019 A1 | 10/2009 | Volanthen et al. |
| 2009/0302608 A1* | 12/2009 | Andresen .............. F03D 7/0224 290/44 |
| 2010/0013227 A1* | 1/2010 | Weitkamp ............... F03D 1/003 290/44 |
| 2010/0021298 A1 | 1/2010 | Sandvad |
| 2010/0129215 A1 | 5/2010 | Preus |
| 2010/0140936 A1 | 6/2010 | Benito et al. |
| 2010/0209247 A1 | 8/2010 | Becker et al. |
| 2010/0253569 A1 | 10/2010 | Stiesdal |
| 2011/0018268 A1 | 1/2011 | Snel et al. |
| 2011/0135466 A1 | 6/2011 | Latorre et al. |
| 2013/0028740 A1* | 1/2013 | Koehnke ............... F03D 7/0224 416/147 |
| 2014/0028025 A1* | 1/2014 | Ibendorf ............... F03D 7/0224 290/44 |

\* cited by examiner

SYSTEM AND METHOD FOR PREVENTING ROTOR BLADE TOWER STRIKE

FIELD OF THE INVENTION

The present subject matter relates generally to wind turbines, and more particularly to a system and method for preventing tower strike by a rotor blade of a wind turbine.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more turbine blades. The turbine blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

To ensure that wind power remains a viable energy source, efforts have been made to increase energy outputs by modifying the size and capacity of wind turbines. One such modification has been to increase the length of the turbine blades. In addition, various rotor blades are manufactured with a pre-bend or a tendency to bend at a certain location. Such rotor blades, however, may be more susceptible to striking the tower of the wind turbine. A tower strike can significantly damage a turbine blade and the tower and, in some instances, can even bring down the entire wind turbine.

Devices and systems are known for detecting turbine blade deflection using various types of active or mechanical sensors. For example, U.S. Pat. No. 6,619,918 describes the use of fiber optic strain gauges on the turbine blades to measure load on the blades and to deduce tip clearance as a function of the measured load. Further, U.S. Pat. No. 7,059,822 describes a system wherein beams are coupled to the blades and deflection of the blades is determined as a function of the amount of deflection of the beams. Moreover, U.S. Pat. No. 7,246,991 describes a control system for avoiding a tower strike that uses a signal from a sensor that measures deflection of the turbine blades. Several possible sensor types are described, including strain gauges, accelerometers mounted in the blades, and active radar devices.

The conventional sensors and associated systems are relatively complex and costly, and calibrating such sensors can be quite complex and time consuming. Moreover, the control systems of most pitch systems are only concerned with reliability in ensuring that one out of three blades fails at feather, rather than ensuring that all three blades reliably stay out of an unsafe region (i.e. the region corresponding to a likely tower strike occurrence).

Accordingly, there is a need for an improved system and method for preventing tower strike by a rotor blade of a wind turbine that does not use the aforementioned sensors.

BRIEF DESCRIPTION OF THE INVENTION

Aspects and advantages of the present subject matter will be set forth in part in the following description, or may be obvious from the description, or may be learned through practice of the invention.

In one aspect, a system for preventing a rotor blade from striking a tower of the wind turbine is disclosed. The system includes a pitch adjustment mechanism configured to rotate the rotor blade about a pitch axis, at least one electrical switch, and a mechanically-actuated positional switch. The pitch adjustment mechanism includes a motor and a brake. The at least one electrical switch is configured with one of the motor or the brake. The positional switch is fixed within a hub of the wind turbine. Further, the positional switch is configured with the electrical switch such that if the rotor blade rotates to an unsafe region, the positional switch is configured to trigger the electrical switch to implement one of tripping power to the motor of the pitch adjustment mechanism or actuating the brake of the pitch adjustment mechanism.

In another embodiment, the system further includes a first striker plate and a second striker plate, wherein the first and second striker plates define limits of the unsafe region for the rotor blade, and wherein the first and second striker plates rotate with the rotor blade. In a further embodiment, the positional switch is configured between the first striker plate and the second striker plate. As such, if the positional switch contacts one of the striker plates as the rotor blade rotates about the pitch axis, the positional switch is configured to trigger the electrical switch to implement one of tripping power to the motor or actuating the brake.

In yet another embodiment, the first and second striker plates are spaced 180 degrees apart from one another so as to define the unsafe region for the rotor blade. In additional embodiments, the first and second striker plates may be spaced any suitable angle apart from one another to define the unsafe region. In a further embodiment, the mechanically-actuated positional switch is a limit switch. In still another embodiment, the system includes an additional electrical switch, wherein one of the electrical switches is configured with the motor of the pitch adjustment mechanism and the other electrical switch is configured with the brake of the pitch adjustment mechanism. Further, in one embodiment, the electrical switches may be contactors, wherein when the positional switch enters the unsafe region, one of the contactors is configured to open so as to trip power to the motor of the pitch adjustment mechanism and the other contactor is configured to open so as to actuate the brake of the pitch adjustment mechanism. In another embodiment, the system may also include a safety controller configured with the positional switch and the contactors. In one embodiment, the safety controller may be a relay. In still further embodiments, the system may include a reset switch and/or a bypass switch configured with the relay.

In another aspect, a rotor blade assembly configured to prevent a rotor blade from striking a tower of the wind turbine is disclosed. The rotor blade assembly includes a rotor blade extending from a blade root to a blade tip. The rotor blade has a pressure side surface and a suction side surface. The pressure side surface and the suction side surface each extend between a leading edge and a trailing edge. The rotor blade assembly further includes a pitch bearing configured between the rotor blade and a hub of the wind turbine. The pitch bearing may be configured to rotate the rotor blade about a pitch axis. In addition, the rotor blade assembly includes a pitch adjustment mechanism configured to rotate the pitch bearing about the pitch axis, the pitch adjustment mechanism having a motor and a brake. Further, the rotor blade assembly may include at least one electrical switch configured with one of the motor or the brake. In addition, the rotor blade assembly may include a mechanically-actuated positional switch fixed within a hub of the wind turbine. The positional switch may be configured with the electrical switch such that if the rotor blade rotates to an unsafe region, the positional switch is configured to trigger the electrical switch to implement one of tripping power to the motor of the pitch adjustment mechanism or actuating the brake of the pitch adjustment mechanism.

In still a further aspect, a method for preventing a rotor blade from striking a tower of the wind turbine is disclosed. The method includes determining an unsafe region for the rotor blade, the unsafe region defined by at least two different pitch angles; monitoring, via a mechanically-actuated positional switch, a pitch angle of the rotor blade to determine if the pitch angle enters the unsafe region; implementing, via an electrical switch, one of tripping power to a motor of a pitch adjustment mechanism or actuating a brake of the pitch adjustment mechanism if the positional switch determines that the pitch angle is in the unsafe region.

In another embodiment, the unsafe region is defined by a first striker plate and a second striker plate located within the blade root of the rotor blade, wherein the first and second striker plates rotate with the rotor blade. In additional embodiments, the first and second striker plates are spaced 180 degrees apart from one another so as to define the unsafe region for the rotor blade. In additional embodiments, the first and second striker plates may be spaced any suitable angle apart from one another to define the unsafe region. In a further embodiment, the positional switch may be configured to contact one of the first and second striker plates if the rotor blade enters the unsafe region.

In another embodiment, the method may include utilizing at least two electrical switches, wherein the electrical switches comprise contactors, wherein when the positional switch breaches the unsafe region, one of the contactors is configured to open so as to trip power to the motor of the pitch adjustment mechanism and the other contactor is configured to open so as to actuate the brake of the pitch adjustment mechanism.

Additionally, the method may include utilizing a safety controller configured with the positional switch and the contactors. In one embodiment, the safety controller may include a relay. In yet another embodiment, the method may include resetting the positional switch via a reset switch.

These and other features, aspects and advantages of the present subject matter will become better understood with reference to the following description and appended claims. The accompanying drawings, which are incorporated in and constitute a part of this specification, illustrate embodiments of the present subject matter and, together with the description, serve to explain the principles of the present subject matter.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which.

DETAILED DESCRIPTION OF THE INVENTION

Figure 1:
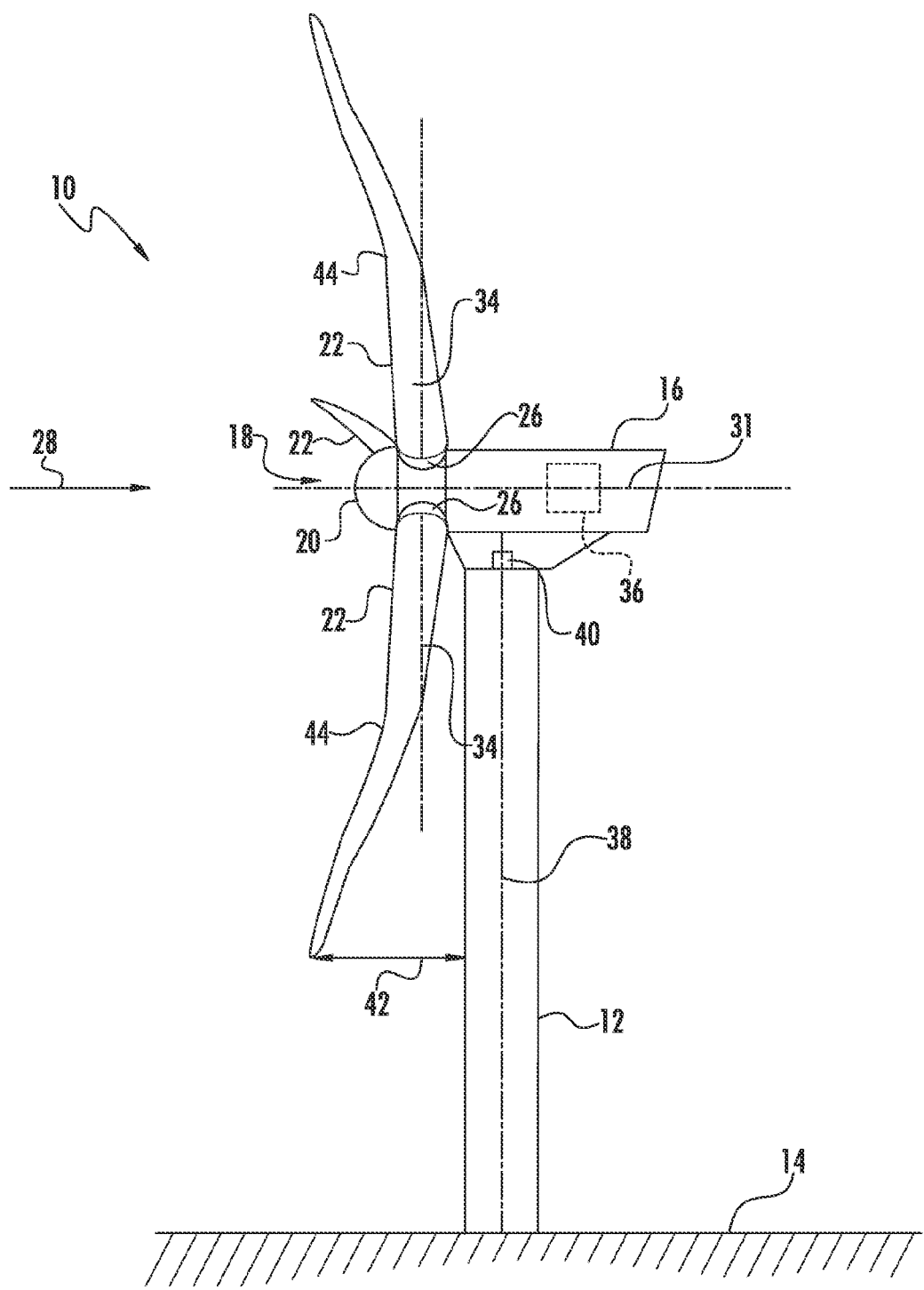
FIG. 1 illustrates a perspective view of one embodiment of a wind turbine according to the present disclosure.

Reference now will be made in detail to embodiments of the present subject matter, one or more examples of which are illustrated in the drawings. Each example is provided by way of explanation, not limitation of the present subject matter. In fact, it will be apparent to those skilled in the art that various modifications and variations can be made in the present subject matter without departing from the scope or spirit of the present subject matter. For instance, features illustrated or described as part of one embodiment can be used with another embodiment to yield a still further embodiment. Thus, it is intended that the present subject matter covers such modifications and variations as come within the scope of the appended claims and their equivalents.

Generally, the present disclosure is directed to a system and method for preventing a rotor blade having a pre-bend or a tendency to bend from striking a wind turbine tower. The system includes a pitch adjustment mechanism configured to rotate the rotor blade about a pitch axis, at least one electrical switch, and a mechanically-actuated positional switch. The pitch adjustment mechanism includes a motor and a brake, wherein the electrical switch can be configured with either one or both of the motor or the brake. The positional switch is fixed with a hub of the wind turbine. Further, the positional switch is configured with the electrical switch such that if the rotor blade rotates to an unsafe region, the positional switch triggers the electrical switch to implement one of tripping power to the motor of the pitch adjustment mechanism or actuating the brake of the pitch adjustment mechanism.

The present disclosure provides various advantages not present in the prior art. For example, the system and method keeps the blades in a safe operating region with and without a functioning pitch adjustment mechanism by bypassing the control system in the event of a failure. Further, the present disclosure allows for the usage of pre-bended or tendency to bend blades without the concern of a tower strike. Moreover, the present disclosure does not require a hard stop to keep the rotor blade out of the unsafe region which could damage various wind turbine components, e.g. the gears, the gearbox and the motor. In addition, the present subject matter allows technicians to carry-on with maintenance as usual with full rotation capabilities of the rotor blade when there is no danger of a tower strike (i.e. when the rotor is fixed). Further, where double redundancy involved, e.g. by breaking power to the motor and the brake, the present disclosure provides a highly reliable solution. Still further advantages of the present disclosure include a system and method that does not require proximity sensors, lasers, or other cumbersome sensors to detect how close a blade might be to the tower.

Referring now to the drawings, FIG. 1 illustrates a perspective view of one embodiment of a horizontal-axis wind turbine 10 that may implement the system and method according to the present disclosure. However, it should be appreciated that the wind turbine 10 may also be a vertical-axis wind turbine. The wind turbine 10 includes a tower 12 that extends from a support system 14, a nacelle 16 mounted on the tower 12, and a rotor 18 that is coupled to the nacelle 16. The rotor 18 includes a rotatable hub 20 and one or more turbine blades 22 coupled to and extending outward from the hub 20. During operation of the wind turbine 10, wind strikes the turbine blades 22 from a wind direction 28, which causes the rotor 18 to rotate about an axis of rotation 31. The tower 12 is fabricated from tubular metal, concrete, or any other suitable material and is configured on a support structure 14.

The turbine blades 22 may generally have any suitable length that enables the wind turbine 10 to function as designed. For example, the turbine blades 22 may have a length ranging from about 15 meters (m) to about 90 m. The turbine blades 22 are spaced about the hub 20 to facilitate rotating the rotor 18 to enable kinetic energy to be transferred from the wind into usable mechanical energy, and subsequently, electrical energy. Specifically, the hub 20 may be rotatably coupled to an electric generator (not illustrated) positioned within the nacelle 16 to permit electrical energy to be produced. Further, the turbine blades 22 may be mated to the hub 20 by coupling a blade root portion to the hub 20 at a plurality of load transfer regions 26. Thus, any loads induced to the turbine blades 22 are transferred to the hub 20 via the load transfer regions 26.

As shown in the illustrated embodiment, the wind turbine 10 may also include a turbine control system or turbine controller 36 within the nacelle 16 or at any location on or in the wind turbine 10 or the support system 14. The controller 36 may be configured to control the various operating modes of the wind turbine 10 (e.g., start-up or shut-down sequences). Additionally, the controller 36 may be configured to control a pitch angle or blade pitch of each of the turbine blades relative to a pitch axis 34 via a pitch adjustment mechanism 32 (FIG. 3) to control the load and power generated by the wind turbine 10 by adjusting an angular position of at least one turbine blade 22 relative to the wind. Further, as the direction 28 of the wind changes, the controller 36 may be configured to control a yaw direction of the nacelle 16 about a yaw axis 38 to position the turbine blades 22 with respect to the direction 28 of the wind. For example, the controller 36 may control a yaw drive mechanism 40 of the nacelle 16 in order to rotate the nacelle 16 about the yaw axis 38.

Figure 2:
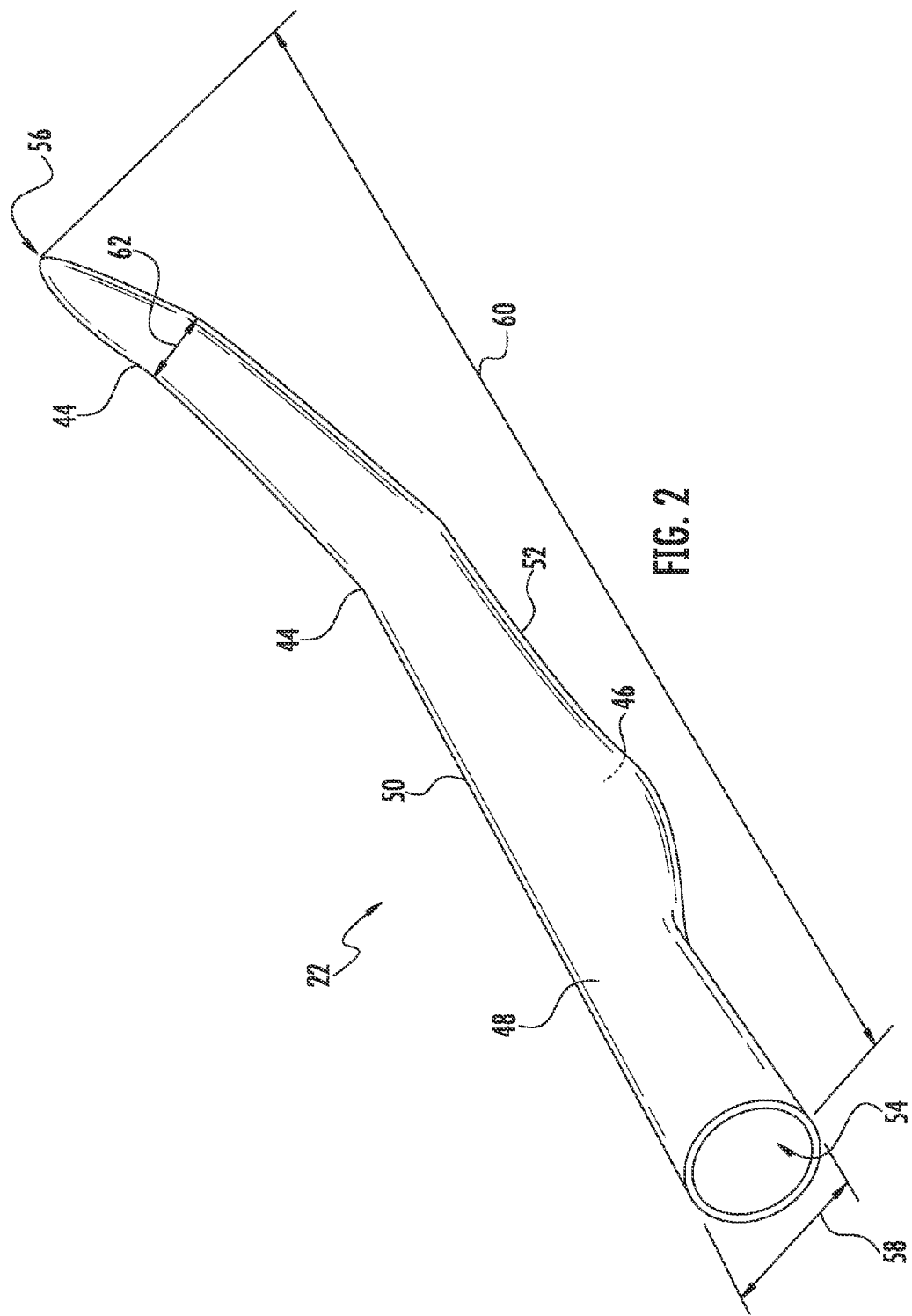
FIG. 2 illustrates a perspective view of one embodiment of a rotor blade of a wind turbine according to the present disclosure.

Referring to FIG. 2, a rotor blade 22 according to the present disclosure may include exterior surfaces defining a pressure side 46, a suction side 48, a leading edge 50, and a trailing edge 52. The pressure side 46 and suction side 48 may each extend between the leading edge 50 and the trailing edge 52. The exterior surfaces may extend between a blade tip 56 and a blade root 54 in a generally span-wise direction, as discussed below. One or more of the pressure side 46, suction side 48, the leading edge 50 and/or the trailing edge 52 may be generally aerodynamic surfaces having generally aerodynamic contours, as is generally known in the art. For example, the pressure side 46, suction side 48, the leading edge 50 and the trailing edge 52 as shown have generally aerodynamic surfaces having generally aerodynamic contours and thus forming an airfoil cross-sectional profile. The rotor blade 22 may further define a chord 58 and a span 60 extending in chord-wise and span-wise directions, respectively. As shown, the chord 58 may vary throughout the span 60 of the rotor blade 22. Thus, as discussed below, a local chord 62 may be defined for the rotor blade 22 at any point on the rotor blade 22 along the span 60.

Figure 3:
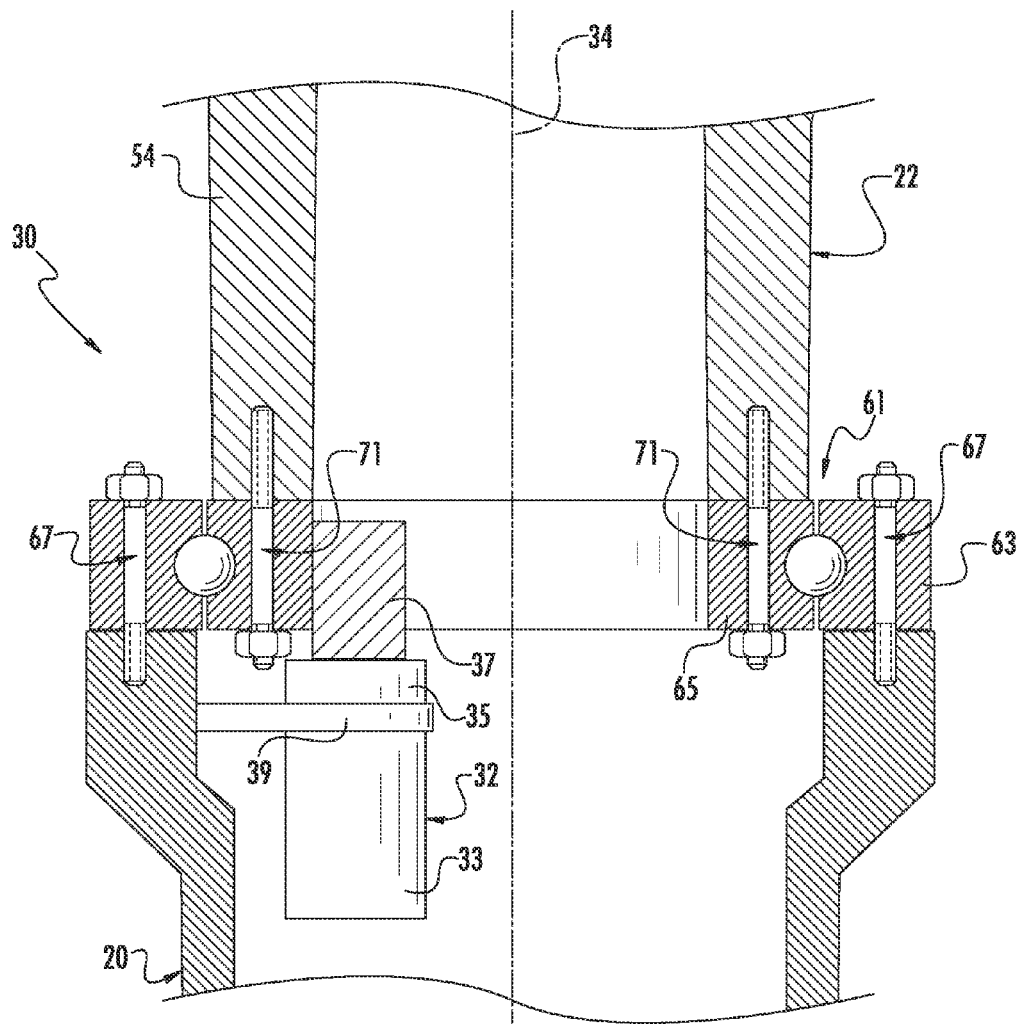
FIG. 3 illustrates a perspective view of one embodiment of a rotor blade assembly of a wind turbine according to the present disclosure.

Referring now to FIG. 3, a rotor blade assembly 30 according to the present disclosure including rotor blade 22 coupled to the hub 20 of the wind turbine 10 through a pitch bearing 61 is illustrated. In general, the pitch bearing 61 may include an outer bearing race 63 and inner bearing race 65. The outer bearing race 63 may generally be configured to be mounted to the hub 20 using a plurality of nut-bolt combinations 67 and/or other suitable mechanical fasteners. Similarly, the inner bearing race 65 may be configured to be mounted to the blade root 54 using a plurality of nut-bolt combinations 71. The pitch angle of each rotor blade 22 may be adjusted by rotating the inner bearing race 65 of the pitch bearing 61 relative to the outer bearing race 63. Pitching of each rotor blade 22 may thus occur in this fashion. It should be understood, however, that the present disclosure is not limited to a pitch bearing 61 coupling the rotor blade 22 to the hub 20. Rather, any suitable device or apparatus may be utilized to couple the rotor blade 22 to the hub 20, provided that such coupling device or apparatus may facilitate pitching of the rotor blade 22.

Pitching of the rotor blade 22 may be caused by the pitch adjustment mechanism 32. In general, the pitch adjustment mechanism 32 may include any suitable components and may have any suitable configuration that allows the mechanism 32 to function as described herein. For example, as shown in the illustrated embodiment, the pitch adjustment mechanism 32 may include a pitch drive motor 33 (e.g., any suitable electric motor including an AC or DC motor), a pitch drive gearbox 35, and a pitch drive pinion 37. In such an embodiment, the pitch drive motor 33 may be coupled to the pitch drive gearbox 35 so that the pitch drive motor 33 imparts mechanical force to the pitch drive gearbox 35. Similarly, the pitch drive gearbox 35 may be coupled to the pitch drive pinion 37 for rotation therewith. The pitch drive pinion 37 may, in turn, be in rotational engagement with the inner bearing race 65 (e.g., via a gear mesh) such that rotation of the pitch drive pinion 37 results in rotation of the inner bearing race 65 relative to the outer bearing race 63 and, thus, rotation of the rotor blade 22 relative to the hub 20. The pitch drive motor 33 also includes a brake 39.

As indicated above, operation of the pitch adjustment mechanism 32 for pitching each rotor blade 22 may be controlled by the controller 36. Such pitching may occur constantly or intermittently during operation of the wind turbine 10 and thus during the rotational cycle of a rotor blade 22. Thus, the controller 36 may be configured to cause the pitch adjustment mechanism 32 to pitch the rotor blade 22 on a constant or intermittent basis. Further, the pitch angle of the rotor blade 22 may be determined relative to a fine position and/or a feathered position for the rotor blade. The fine position may be a position of maximum aerodynamic torque for the rotor blade 22. Thus, in the fine position, maximum loading of the rotor blade 22 may occur during operation of the wind turbine 10. The feathered position may be a position of minimum or zero aerodynamic torque for the rotor blade 22. Thus, in the feathered position, minimum or zero loading of the rotor blade 22 may occur during operation of the wind turbine 10. The fine position may be considered to have a pitch angle of approximately 0 degrees, such as in the range between approximately 5 degrees and approximately −5 degrees, such as in the range between approximately 2 degrees and approximately −2 degrees. The feathered position may be considered to have a pitch angle of approximately 90 degrees, such as in the range between approximately 85 degrees and approximately 95 degrees, such as in the range between approximately 88 degrees and approximately 92 degrees. The pitch angles for the fine position 92 and feathered position 94 may be defined with respect to each other and with respect to the wind direction 28.

Referring back to FIGS. 1 and 2, each of the rotor blades 22 may, in exemplary embodiments, be curved. Curving of the rotor blades 22 may entail bending the rotor blades 22 in a generally flap-wise direction and/or in a generally edge-wise direction. The flap-wise direction may generally be construed as the direction (or the opposite direction) in which the aerodynamic lift acts on the rotor blade 22. The edgewise direction is generally perpendicular to the flap-wise direction. Flap-wise curvature of the rotor blade 22 is also known as pre-bend, while edgewise curvature is also known as sweep. As shown in the illustrated embodiments, each of the rotor blades 22 includes a pre-bend or tendency to bend at location 44. Curving may enable the rotor blade 22 to better withstand flap-wise and edgewise loads during operation of the wind turbine 10, however, such pre-bends 44 or tendencies to bend may have a high probability of striking the tower 12.

Further, as the turbine blades 22 are rotated, they are also subjected to various forces and bending moments. As such, the turbine blades 22 may deflect from a neutral, or non-deflected, position to a deflected position, which may cause the blades 22 to deflect towards the tower 12, reducing the overall blade clearance 42 (FIG. 1). As aerodynamic loads increase, excessive forces and bending moments can cause one or more of the turbine blades 22 to strike the tower 12 resulting in significant damage and downtime.

Figure 4:
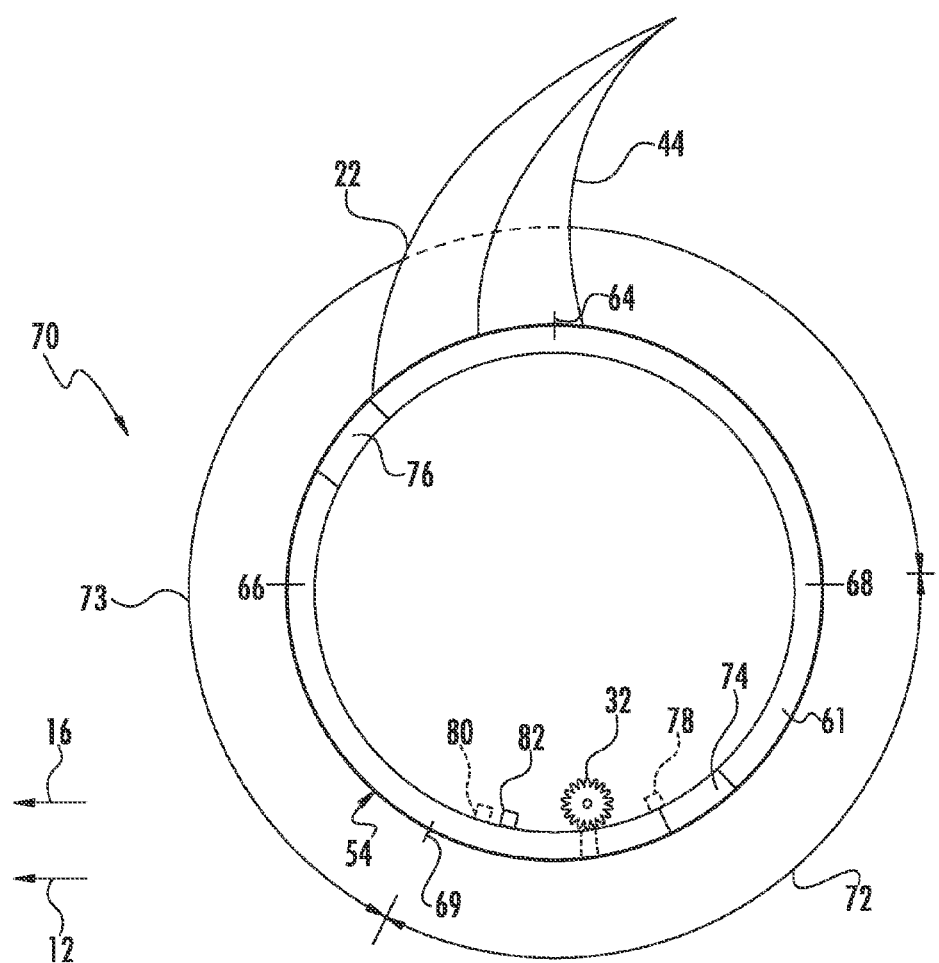
FIG. 4 illustrates an internal view of one embodiment of a blade root of a rotor blade from inside a hub of a wind turbine according to the present disclosure.
Figure 5:
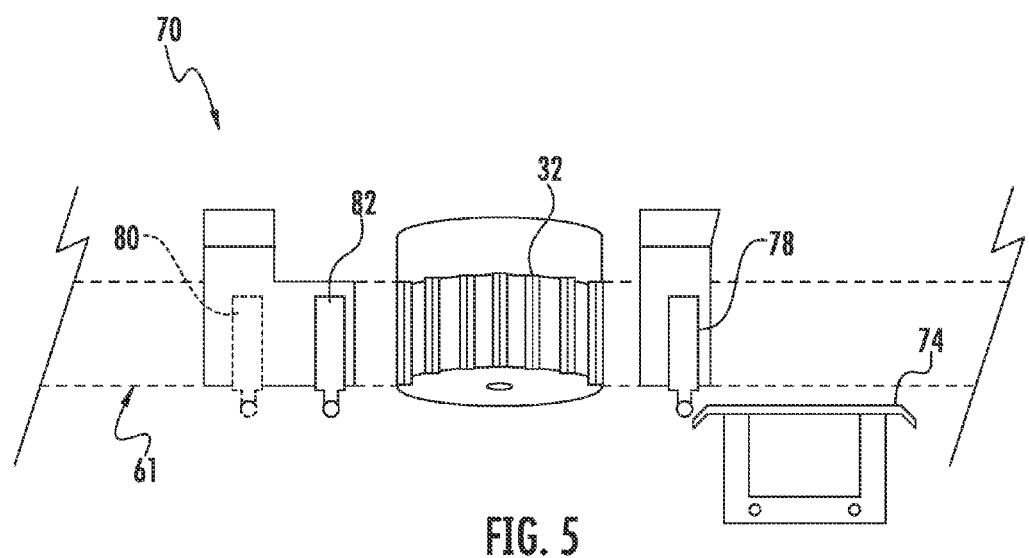
FIG. 5 illustrates a detailed, internal view of one embodiment of a system for preventing a rotor blade from striking a tower of a wind turbine according to the present disclosure.

Accordingly, the present disclosure is directed to a system and method for preventing rotor blades 22 having a pre-bend or tendency to bend from striking the tower 12. Referring to FIGS. 4 and 5 specifically, one embodiment of the system 70 of the present disclosure is illustrated. As shown, FIG. 4 illustrates one embodiment of the rotor blade 22 looking at the blade root 54 from inside the hub 20 outward towards the blade tip 56 along the span 60 of the rotor blade 22; and FIG. 5 illustrates a detailed internal view of the system 70 from within the pitch bearing 61. The arrows 12 and 16 pointing to the left of FIG. 4 indicate the location of the tower 12 and the nacelle 16 with respect to the illustrated rotor blade 22.

The system 70 may be incorporated into already existing controls of the wind turbine 10 or installed into new turbines. For example, referring to FIG. 4, limit switches 78, 80 (shown in dotted lines) are typical controls employed by modern wind turbines to maintain the rotor blade 22 between a 0-degree reference point 64 and a 90-degree reference point 66. The pre-bend 44 or tendency to bend of the rotor blade 22 is illustrated at the 0-degree reference point 64. It should be understood that the 0-degree reference point 64 and the 90-degree reference point 66 are intended to provide an illustrative reference point and are not meant to limit the system 70 in any manner. Further, as shown in the illustrated embodiment, the 0-degree reference point 64 is located in a power position, whereas the 90-degree reference point 66 is in a feather position. Again, it should be understood that such positioning is merely for illustrative purposes only.

Figure 7:
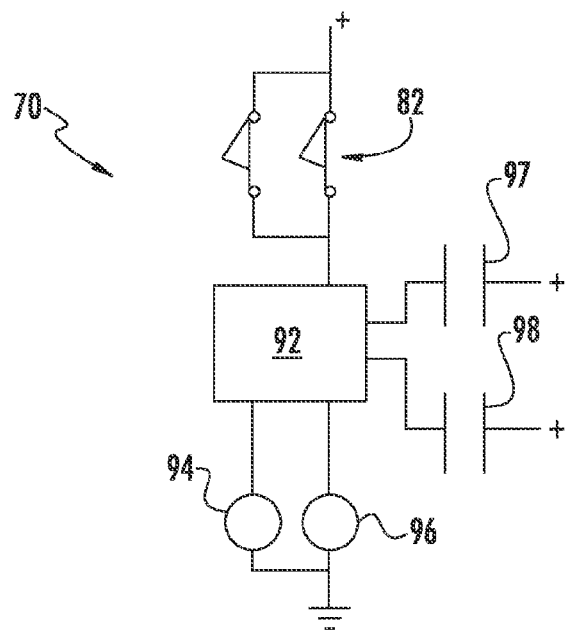
FIG. 7 illustrates another embodiment of a system for preventing a rotor blade from striking a tower according to one embodiment of the present disclosure; and, FIG. 8 illustrates a method for preventing a rotor blade from striking a tower of the wind turbine according to the present disclosure.

Referring specifically to FIG. 4, the illustrated embodiment of the system 70 includes the pitch adjustment mechanism 32, a mechanically-actuated positional switch 82, and at least one electrical switch 94, 96 (FIG. 7). In one embodiment, for example, the positional switch 82 may be a limit switch fixed within the hub 20 of the wind turbine 10. Alternatively, the positional switch 82 may be any other suitable switch known in the art. In addition, the system 70 may include one or more striker plates 74, 76 configured to rotate with the rotor blade 22. During normal operation, the rotor blade 22 is typically between the 0-degree reference point 64 and the 90-degree reference point 66. In the event of a controller 36 failure, or any other failure, the rotor blade 22 will have a tendency to overshoot markers 64, 66 when rotated by the pitch adjustment mechanism 32. If the rotor blade 22 overshoots markers 64, 66 significantly, then the rotor blade 22 runs the risk of overshooting markers 68 and/or 69, which define the unsafe region 72, thereby striking the tower 12 of the wind turbine 10.

Accordingly, the positional switch 82 of the system 70 may be fixed within the hub and configured such that if the rotor blade 22 rotates to the unsafe region 72 (e.g. by contacting one of the striker plates 74, 76), the positional switch 82 triggers one of the electrical switches 94, 96 to implement one of tripping power to the motor of the pitch adjustment mechanism 32 or actuating the brake of the pitch adjustment mechanism 32. For example, in one embodiment, the positional switch 82 may be located such that whether it contacts the 0-degree striker plate 74 or the 90-degree striker plate 76, the switch 82 maintains the rotor blade 22 in the safe region 73 in the event of a controls failure.

As such, the first and second striker plates 74, 76 define limits of the unsafe region for the rotor blade 22 and are configured to rotate with the rotor blade 22, whereas the positional switch 82 remains fixed within the hub 20. In one embodiment, for example, the first and second striker plates 74, 76 are spaced 180 degrees apart from one another so as to define the unsafe region 72 for the rotor blade 22. In further embodiments, the first and second striker plates 94, 96 may be spaced any suitable angle and/or apart from one another so as to define the unsafe region 72. As such, if the rotor blade 22 rotates about the pitch axis 34 such that the positional switch 82 contacts one of the striker plates 74, 76 (i.e. indicating that the plate has entered the unsafe region 72), then the positional switch 82 triggers at least one of the electrical switches 74, 76 to trip power to the motor of the pitch adjustment mechanism or actuate the brake of the pitch adjustment mechanism.

Referring now to illustrated embodiment of FIG. 7, the positional switch 82 may be capable of statistically maintaining the rotor blade 22 within the safe region 73 because the switch 82 can have positive opening-action doubly-redundant contacts as shown. As such, the statistical guarantee comes from tripping power to the motor 33 of the pitch adjustment mechanism 32 by electrical switch 94 and actuating the brake of the motor 33 by electrical switch 96 since either electrical switch 94, 96 alone is enough to satisfactorily stop the rotor blade 22.

In a further embodiment, the electrical switches 94, 96 may be contactors. As such, when the positional switch 82 enters the unsafe region 72, the contactor 94 is configured to open so as to trip power to the motor 33 of the pitch adjustment mechanism 32, whereas the contactor 96 is configured to open so as to actuate the brake of the pitch adjustment mechanism 32.

The system 70 may also include a safety controller 92 configured with the positional switch 82 and the contactors 94, 96. In one embodiment, for example, the safety controller 92 may be a relay. As such, if the rotor blade 22 enters the unsafe region 72, the safety controller 92 is configured to open one of the contactors 94, 96. For example, the safety controller 92 may open both contactors 94, 96 simultaneously or may open only one of the contactors 94, 96. The system 70 may also include a reset switch 97 to reset the contactors 94, 96 after at least one of the contactors 94, 96 has been opened. In addition, in a further embodiment, the system 70 may include a double-redundant contact bypass switch 98 for maintenance and installation purposes. Such a bypass switch 98 may be accessible from within the hub 20.

Figure 6:
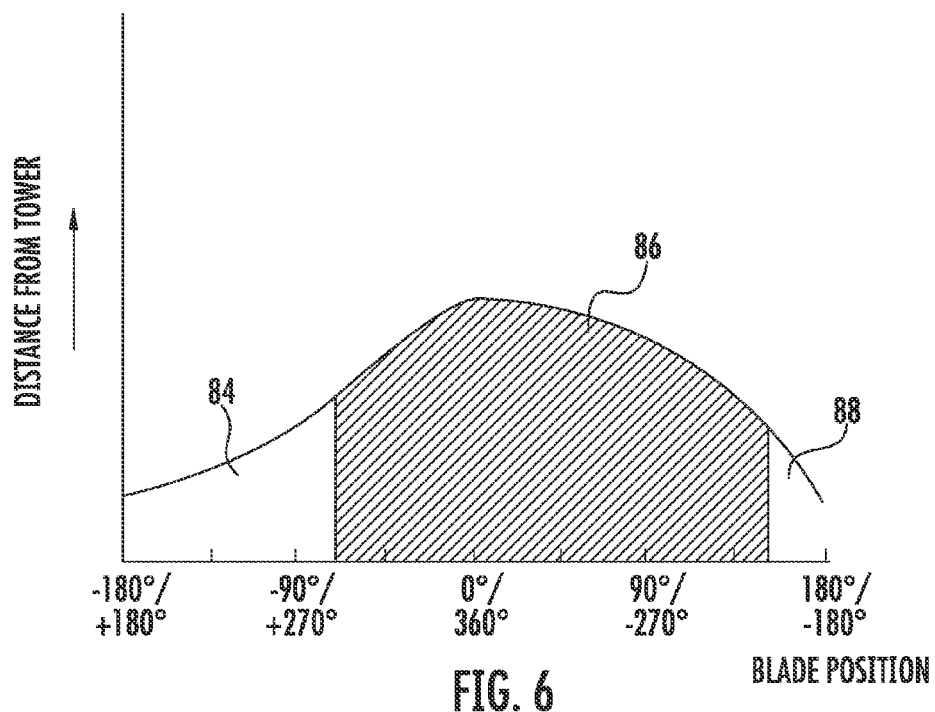
FIG. 6 illustrates a graph of the blade position (x-axis) versus distance from the tower (y-axis) according to one embodiment of the present disclosure.

Referring back to FIG. 6, a graph of the blade position (x-axis) versus distance from the tower (y-axis) is illustrated. The shaded area 86 illustrates the safe region for operation of the rotor blade 22. During normal operating conditions, the controller 36 may operate so as to minimize the safe region, but the controller 36 is subject to failure. Area 84 illustrates an unsafe area when overshoot is beyond power, e.g. beyond 0 degrees. Area 88 illustrates the unsafe area when overshoot is beyond feather, e.g. beyond 90 degrees. As such, the positional switch 82 is located so that it covers areas 84, 88, though multiple positional switches or multiple striker plates, or a combination of both may also be employed.

Figure 8:
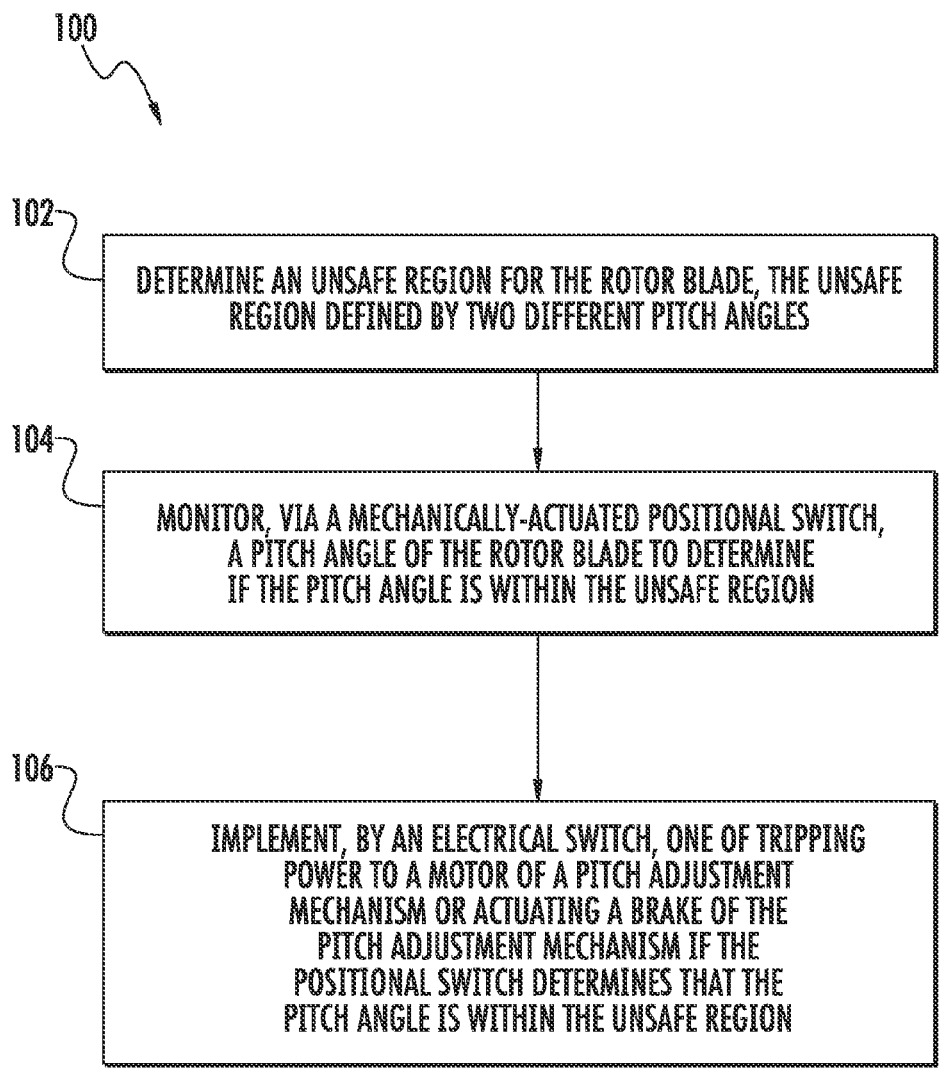

Referring now to FIG. 8, a method 100 for preventing the rotor blade from striking the tower of the wind turbine is disclosed. The method 100 includes a step 102 of determining an unsafe region for the rotor blade, the unsafe region defined by at least two different pitch angles. The method also includes a step 104 of monitoring, via a mechanically-actuated positional switch, a pitch angle of the rotor blade to determine if the pitch angle enters the unsafe region. Next, the method 100 includes a step of 106 implementing, by an electrical switch, one of tripping power to a motor of a pitch adjustment mechanism or actuating a brake of the pitch adjustment mechanism if the positional switch determines that the pitch angle enters the unsafe region.

This written description uses examples to disclose the present subject matter, including the best mode, and also to enable any person skilled in the art to practice the present subject matter, including making and using any devices or systems and performing any incorporated methods. The patentable scope of the present subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for preventing a rotor blade from striking a tower of the wind turbine, the system comprising:
    a pitch adjustment mechanism configured to rotate the rotor blade about a pitch axis, the pitch adjustment mechanism comprising a motor and a brake;
    a first electrical switch electrically coupled to the motor;
    a second electrical switch electrically coupled to the brake;
    a mechanically-actuated positional switch fixed within a hub of the wind turbine, the positional switch electrically coupled to the first and second electrical switches such that if the rotor blade rotates to an unsafe region, the positional switch triggers the first electrical switch to trip power to the and triggers the second electrical switch to actuate the brake;
    a first striker plate mounted to a blade root of the rotor blade; and
    a second striker plate mounted to the blade root, the first and second striker plates spaced apart circumferentially by a predetermined angle so as to define limits of the unsafe region, the first and second striker plates mounted so as to rotate with the rotor blade.

2. The system of claim 1, wherein the positional switch is configured between the first striker plate and the second striker plate, and wherein, if the positional switch contacts one of the striker plates as the rotor blade rotates about the pitch axis, the positional switch is configured to trigger the first and second electrical switches to implement one of tripping power to the motor or actuating the brake.

3. The system of claim 1, wherein the first and second striker plates are mounted and spaced 180 degrees apart from one another so as to define the unsafe region for the rotor blade.

4. The system of claim 1, wherein the mechanically-actuated positional switch comprises a limit switch.

5. The system of claim 1, wherein the first and second electrical switches comprise contactors, wherein when the positional switch enters the unsafe region, one of the contactors is configured to open so as to trip power to the motor of the pitch adjustment mechanism and the other contactor is configured to open so as to actuate the brake of the pitch adjustment mechanism.

6. The system of claim 5, further comprising a safety controller configured with the positional switch and the contactors, wherein the safety controller comprises a relay.

7. The system of claim 6, further comprising a reset switch configured with the safety controller.

8. The system of claim 6, further comprising a bypass switch configured with the safety controller.

9. A rotor blade assembly for a wind turbine, the rotor blade assembly configured to prevent a rotor blade from striking a tower of the wind turbine, the assembly comprising:
    a rotor blade extending from a blade root to a blade tip, the rotor blade comprising a pressure side surface and a suction side surface, the pressure side surface and the suction side surface each extending between a leading edge and a trailing edge;
    a pitch bearing configured between the rotor blade and a hub of the wind turbine, the pitch bearing configured to rotate the rotor blade about a pitch axis;
    a pitch adjustment mechanism configured to rotate the pitch bearing about the pitch axis, the pitch adjustment mechanism comprising a motor and a brake;
    a first electrical switch electrically coupled to the motor;
    a second electrical switch electrically coupled to the brake;
    a mechanically-actuated positional switch fixed within a hub of the wind turbine, the positional switch electrically coupled to the first and second electrical switches such that if the rotor blade rotates to an unsafe region, the positional switch triggers the first electrical switch to trip power to the motor and triggers the second electrical switch to actuate the brake;
    a first striker plate mounted to a blade root of the rotor blade; and
    a second striker plate mounted to the blade root, the first and second striker plates spaced apart circumferentially by a predetermined angle so as to define limits of the unsafe region, the first and second striker plates mounted so as to rotate with the rotor blade.

10. A method for preventing a rotor blade from striking a tower of a wind turbine, the method comprising:

Determining an unsafe region for the rotor blade, the unsafe region defined by first and second striker plates spaced circumferentially apart by a predetermined angle, wherein each of the first and second striker plates are mounted to a blade root of the rotor blade;

determining whether the rotor blade enters the unsafe region by monitoring whether a mechanically-actuated positional switch strikes one of the first or second striker plates; and, if the positional switch strikes one of the first or second striker plates, tripping, via a first electrical switch, power to a motor of a pitch adjustment mechanism and actuating, via a second electrical switch, a brake of the pitch adjustment mechanism.

11. The method of claim 10, wherein the first and second striker plates are mounted and spaced 180 degrees apart from one another so as to define the unsafe region for the rotor blade.

12. The method of claim 10, wherein the positional switch is configured to contact one of the first and second striker plates if the rotor blade enters the unsafe region.

13. The method of claim 10, wherein the first and second electrical switches comprise contactors, wherein when the positional switch enters the unsafe region, one of the contactors is configured to open so as to trip power to the motor of the pitch adjustment mechanism and the other contactor is configured to actuate the brake of the pitch adjustment mechanism.

14. The method of claim 13, further comprising utilizing a safety controller configured with the positional switch and the contactors, wherein the safety controller comprises a relay.

15. The method of claim 14, further comprising a bypass switch configured with the safety controller.

16. The method of claim 14, further comprising resetting the positional switch via a reset switch, wherein the reset switch is configured with the safety controller.

17. The method of claim 10, wherein the mechanically-actuated positional switch comprises a limit switch.

* * * * *